(12) United States Patent
Woolstencroft et al.

(10) Patent No.: US 7,096,890 B2
(45) Date of Patent: Aug. 29, 2006

(54) INVERSION LINER AND LINER COMPONENTS FOR CONDUITS

(75) Inventors: Jon H. Woolstencroft, St. Catharines (CA); Robert Pleydon, St Catharines (CA); Mark Tigchelaar, Burlington (CA)

(73) Assignee: Saint-Gobain Technical Fabrics Canada, Ltd., St. Catharines (CA)

( * ) Notice: Subject to any disclaimer, the term of this patent is extended or adjusted under 35 U.S.C. 154(b) by 0 days.

(21) Appl. No.: 10/174,580

(22) Filed: Jun. 19, 2002

(65) Prior Publication Data

US 2003/0234057 A1 Dec. 25, 2003

(51) Int. Cl.
*F16L 55/16* (2006.01)

(52) U.S. Cl. .......................... 138/98; 138/125; 138/146

(58) Field of Classification Search ............... 138/97, 138/98, 125, 146

See application file for complete search history.

(56) References Cited

U.S. PATENT DOCUMENTS

| | | |
|---|---|---|
| 130,303 A | 8/1872 | Libby |
| 143,661 A | 10/1873 | Blake |
| 154,725 A | 9/1874 | Street |
| 268,903 A | 12/1882 | Johnson |
| 470,669 A | 3/1892 | Fitzpatrick |
| 602,301 A | 4/1898 | Bramlette |
| 614,749 A | 11/1898 | Pallas |
| 680,974 A | 8/1901 | Healey |
| 738,289 A | 9/1903 | Buckley |
| 1,226,023 A | 5/1917 | Smith |
| 1,320,413 A | 11/1919 | Reznicek |
| 1,722,764 A | 7/1929 | Rasch |
| 1,736,293 A | 11/1929 | Denburg |

(Continued)

FOREIGN PATENT DOCUMENTS

| | | |
|---|---|---|
| CA | 987576 | 4/1976 |
| CA | 1134290 | 10/1982 |
| CA | 1195128 | 10/1985 |
| CA | 1217416 | 2/1987 |
| CA | 1250737 | 3/1989 |
| CA | 1271115 | 7/1990 |
| CA | 2024027 | 5/2001 |
| DE | 99643 A | 4/1897 |
| DE | 2810991 A1 | 2/1980 |
| DE | 33 39 305 C2 | 8/1987 |

(Continued)

OTHER PUBLICATIONS

International Search Report dated Sep. 22, 2003.
"Engineered Materials Handbook," ASM International, Jan. 1998, p. 20, Introduction to Composites, definitions of reinforcement, resin and roving.
European Search Report dated Jan. 16, 2001.

\* cited by examiner

*Primary Examiner*—James Hook
(74) *Attorney, Agent, or Firm*—Duane Morris LLP

(57) ABSTRACT

Inversion liners are provided which in a first embodiment include first and second flexible fabric layers separated by one or more glass fiber containing layers and joined in tubular form. The second flexible fabric layer further is bonded to a third flexible fabric layer comprising a substantially fluid impermeable layer. An invertible glass-faced liner is also provided by this invention which includes a glass facing on one side and a substantially fluid impermeable layer on the other. The substantially fluid impermeable layer is joined to a flexible fabric layer which is preferably heat bonded to a thin veil joined to a second glass containing layer of this liner embodiment. The inversion liners of this invention can be built-up in multiple layers or blocks to meet end-use design demands while still providing flexural moduli in excess of 500 ksi, preferably about 700–800 ksi.

28 Claims, 3 Drawing Sheets

U.S. PATENT DOCUMENTS

| | | | |
|---|---|---|---|
| 2,090,851 A | 8/1937 | Perkins |
| 2,178,554 A | 11/1939 | Bowie |
| 2,195,222 A | 3/1940 | Neumair |
| 2,198,821 A | 4/1940 | Jessup |
| 2,285,370 A | 6/1942 | Staelin |
| 2,312,993 A | 3/1943 | Stephens |
| 2,326,827 A | 8/1943 | Bynum |
| 2,327,023 A | 8/1943 | Danner |
| 2,345,766 A | 3/1944 | Miller |
| 2,352,768 A | 7/1944 | Brend |
| 2,354,399 A | 7/1944 | Noble |
| 2,424,315 A | 7/1947 | Hyatt et al. |
| 2,468,493 A | 4/1949 | Greenwald |
| 2,575,353 A | 11/1951 | MacEvoy |
| 2,595,408 A | 5/1952 | Quest |
| 2,622,327 A | 12/1952 | Halonen |
| 2,632,205 A | 3/1953 | Harris |
| 2,697,585 A | 12/1954 | Chaney et al. |
| 2,770,950 A | 11/1956 | Collins |
| 2,794,758 A | 6/1957 | Harper et al. |
| 2,910,042 A | 10/1959 | Gallmeyer et al. |
| 2,987,768 A | 6/1961 | Given |
| 3,028,284 A | 4/1962 | Reeves |
| 3,037,228 A | 6/1962 | Cummings |
| 3,044,146 A | 7/1962 | Thomas et al. |
| 3,061,496 A | 10/1962 | Meyer |
| 3,080,269 A | 3/1963 | Pollock et al. |
| 3,122,786 A | 3/1964 | Huisman |
| 3,132,062 A | 5/1964 | Lang et al. |
| 3,175,392 A | 3/1965 | Tharalson |
| 3,179,551 A | 4/1965 | Dudas |
| 3,333,311 A | 8/1967 | Matheny et al. |
| 3,340,115 A | 9/1967 | Rubenstein |
| 3,376,180 A | 4/1968 | Larson et al. |
| 3,376,181 A | 4/1968 | Larson et al. |
| 3,494,813 A | 2/1970 | Lawrence et al. |
| 3,511,734 A | 5/1970 | Darrow |
| 3,560,295 A | 2/1971 | Kimbrell et al. |
| 3,583,169 A | 6/1971 | Morgan |
| 3,603,096 A | 9/1971 | Wells |
| 3,666,586 A | 5/1972 | Lacey |
| 3,720,557 A | 3/1973 | Longoni et al. |
| 3,742,985 A | 7/1973 | Rubenstein |
| 3,753,766 A | 8/1973 | Brown et al. |
| 3,784,441 A | 1/1974 | Kaempen |
| 3,834,421 A | 9/1974 | Daley |
| 3,851,786 A | 12/1974 | Kaempen |
| 3,891,489 A | 6/1975 | Bordner et al. |
| 3,893,878 A | 7/1975 | Kaempen |
| 3,895,604 A | 7/1975 | Ryan |
| 3,915,776 A | 10/1975 | Kaempen |
| 3,927,464 A | 12/1975 | Wallsten |
| 3,940,942 A | 3/1976 | Gower |
| 3,957,416 A | 5/1976 | Kaempen |
| 3,996,967 A | 12/1976 | Takada |
| 4,009,063 A | 2/1977 | Wood |
| 4,064,211 A | 12/1977 | Wood |
| 4,081,303 A | 3/1978 | Rogers et al. |
| 4,127,430 A | 11/1978 | Davis |
| 4,135,958 A | 1/1979 | Wood |
| 4,182,262 A | 1/1980 | Everson et al. |
| 4,197,908 A | 4/1980 | Davis et al. |
| 4,207,130 A | 6/1980 | Barber |
| 4,227,957 A | 10/1980 | Keuchel et al. |
| 4,233,101 A | 11/1980 | Scragg et al. |
| 4,243,075 A * | 1/1981 | McPherson et al. ........ 138/174 |
| 4,247,345 A | 1/1981 | Kadija et al. |
| 4,283,457 A | 8/1981 | Kolsky et al. |
| 4,308,824 A | 1/1982 | Muta et al. |
| 4,327,132 A | 4/1982 | Shinno |
| 4,329,937 A | 5/1982 | Holland |
| 4,350,548 A | 9/1982 | Zenbayashi et al. |
| 4,351,364 A * | 9/1982 | Cocks ........................ 138/133 |
| 4,361,451 A | 11/1982 | Renaud |
| 4,366,012 A | 12/1982 | Wood |
| 4,371,569 A | 2/1983 | Muta et al. |
| 4,373,554 A | 2/1983 | Cook |
| 4,385,885 A | 5/1983 | Wood |
| 4,386,628 A | 6/1983 | Stanley |
| 4,390,574 A | 6/1983 | Wood |
| 4,401,696 A | 8/1983 | Wood |
| 4,419,163 A | 12/1983 | Yamamoto et al. |
| 4,434,115 A | 2/1984 | Chick |
| 4,439,469 A | 3/1984 | Wood |
| 4,442,891 A | 4/1984 | Wood |
| 4,443,498 A | 4/1984 | Shinno |
| 4,446,181 A | 5/1984 | Wood |
| 4,456,401 A | 6/1984 | Williams |
| 4,478,661 A | 10/1984 | Lewis |
| 4,484,602 A | 11/1984 | Guthrie |
| 4,491,617 A | 1/1985 | O'Connor et al. |
| 4,492,095 A | 1/1985 | Brister |
| 4,496,499 A | 1/1985 | Brittain et al. |
| 4,505,613 A | 3/1985 | Koga |
| 4,508,582 A | 4/1985 | Fink |
| 4,529,008 A | 7/1985 | Appleton |
| 4,539,250 A | 9/1985 | Fujii et al. |
| 4,548,783 A | 10/1985 | Dalke et al. |
| 4,568,581 A | 2/1986 | Peoples, Jr. |
| 4,576,858 A | 3/1986 | Fourezon |
| 4,577,388 A | 3/1986 | Wood |
| 4,581,085 A | 4/1986 | Wood |
| 4,581,247 A | 4/1986 | Wood |
| 4,585,033 A | 4/1986 | Westman |
| 4,593,721 A | 6/1986 | Klenk et al. |
| 4,600,615 A | 7/1986 | Hyodo et al. |
| 4,602,974 A | 7/1986 | Wood et al. |
| 4,604,152 A | 8/1986 | Liukko |
| 4,622,196 A | 11/1986 | Wood |
| 4,625,766 A | 12/1986 | Dohlen et al. |
| 4,626,133 A | 12/1986 | Waring |
| 4,630,676 A | 12/1986 | Long, Jr. |
| 4,637,588 A | 1/1987 | Wilhelm et al. |
| 4,637,754 A | 1/1987 | Wood |
| 4,640,313 A | 2/1987 | Stanley |
| 4,649,004 A | 3/1987 | Nohara et al. |
| 4,655,638 A | 4/1987 | Waring |
| 4,668,125 A | 5/1987 | Long, Jr. |
| 4,670,315 A | 6/1987 | Hillemeier et al. |
| 4,672,832 A | 6/1987 | Merker |
| 4,677,472 A | 6/1987 | Wood |
| 4,678,699 A | 7/1987 | Kritchevsky et al. |
| 4,680,066 A | 7/1987 | Wood |
| 4,681,783 A | 7/1987 | Hyodo et al. |
| 4,684,419 A | 8/1987 | Agosta |
| 4,684,556 A | 8/1987 | Ohtsuga et al. |
| 4,685,983 A | 8/1987 | Long, Jr. |
| 4,701,988 A | 10/1987 | Wood |
| 4,710,337 A | 12/1987 | Nordström |
| 4,723,579 A | 2/1988 | Hyodo et al. |
| 4,733,699 A | 3/1988 | Hata |
| 4,738,565 A | 4/1988 | Streatfield et al. |
| 4,752,431 A | 6/1988 | Knowles |
| 4,752,511 A | 6/1988 | Driver |
| 4,754,781 A | 7/1988 | Jan de Putter |
| 4,758,454 A | 7/1988 | Wood |
| 4,759,656 A | 7/1988 | Wilson |
| 4,768,562 A | 9/1988 | Strand |
| 4,770,562 A | 9/1988 | Müller et al. |
| 4,773,450 A | 9/1988 | Stanley |
| 4,776,370 A | 10/1988 | Long, Jr. |

| | | | | | | |
|---|---|---|---|---|---|---|
| 4,777,984 A | 10/1988 | Storah | | 5,329,063 A | 7/1994 | Endoh |
| 4,778,553 A | 10/1988 | Wood | | 5,334,429 A | 8/1994 | Imoto et al. |
| 4,786,345 A | 11/1988 | Wood | | 5,337,823 A | 8/1994 | Nobileau |
| 4,790,975 A | 12/1988 | Järvenkylä et al. | | 5,340,524 A | 8/1994 | McMillan et al. |
| 4,808,098 A | 2/1989 | Chan et al. | | 5,374,174 A | 12/1994 | Long, Jr. |
| 4,810,453 A | 3/1989 | Clarke et al. | | 5,397,513 A | 3/1995 | Steketee, Jr. |
| 4,819,721 A | 4/1989 | Long, Jr. | | 5,409,561 A | 4/1995 | Wood |
| 4,836,715 A | 6/1989 | Wood | | 5,411,060 A * | 5/1995 | Chandler ................ 138/98 |
| 4,851,274 A | 7/1989 | D'Elia | | 5,445,875 A | 8/1995 | Persson |
| 4,867,921 A | 9/1989 | Steketee, Jr. | | 5,451,351 A | 9/1995 | Blackmore |
| 4,871,413 A | 10/1989 | Hyodo et al. | | 5,535,786 A * | 7/1996 | Makela et al. ........... 138/98 |
| 4,877,665 A | 10/1989 | Higuchi et al. | | 5,653,555 A | 8/1997 | Catallo |
| 4,883,557 A | 11/1989 | Morinaga et al. | | 5,680,885 A | 10/1997 | Catallo |
| 4,892,774 A | 1/1990 | Vallance | | 5,698,056 A * | 12/1997 | Kamiyama et al. ....... 138/98 |
| 4,897,135 A | 1/1990 | Aylor, Jr. et al. | | 5,798,013 A | 8/1998 | Brandenburger |
| 4,901,424 A | 2/1990 | Menendez | | 5,836,357 A | 11/1998 | Kittson et al. |
| 4,907,624 A | 3/1990 | Jonasson | | 5,868,169 A | 2/1999 | Catallo |
| 4,925,381 A | 5/1990 | Aoki et al. | | 5,873,391 A | 2/1999 | Kittson et al. |
| 4,927,684 A | 5/1990 | Asensio et al. | | 5,885,679 A * | 3/1999 | Yasue et al. ............. 428/57 |
| 4,933,134 A | 6/1990 | Jarvenkyla | | 5,911,246 A | 6/1999 | Kittson et al. |
| 4,950,356 A | 8/1990 | Grace | | 5,931,199 A | 8/1999 | Kittson et al. |
| 4,950,446 A | 8/1990 | Kinumoto et al. | | 5,993,114 A | 11/1999 | Jones |
| 4,956,038 A | 9/1990 | Morinaga et al. | | 6,018,914 A | 2/2000 | Kamiyama et al. |
| 4,959,110 A | 9/1990 | Russell | | 6,042,668 A * | 3/2000 | Kamiyama et al. ....... 138/98 |
| 4,972,880 A | 11/1990 | Strand | | 6,170,531 B1 | 1/2001 | Jung et al. |
| 4,976,290 A | 12/1990 | Gelin et al. | | 6,196,271 B1 * | 3/2001 | Braun et al. ............. 138/98 |
| 4,980,116 A | 12/1990 | Driver | | 6,228,312 B1 | 5/2001 | Boyce |
| 4,985,196 A | 1/1991 | LeDoux et al. | | 6,254,709 B1 | 7/2001 | Kamiyama et al. |
| 4,986,951 A | 1/1991 | Ledoux et al. | | 6,360,780 B1 * | 3/2002 | Adolphs et al. ............. 138/98 |
| 4,991,006 A | 2/1991 | Wood | | 6,562,426 B1 | 5/2003 | Kamiyama et al. |
| 4,995,761 A | 2/1991 | Barton | | 6,588,983 B1 | 7/2003 | Tenbusch, II |
| 5,010,440 A * | 4/1991 | Endo .................. 138/98 | | 6,615,875 B1 * | 9/2003 | Adolphs et al. ............. 138/98 |
| 5,018,545 A | 5/1991 | Wells | | 2003/0106601 A1 | 6/2003 | Kweon |
| 5,019,417 A | 5/1991 | Northcutt | | 2003/0113489 A1 | 6/2003 | Smith |
| 5,027,895 A | 7/1991 | Barton | | | | |
| 5,029,615 A | 7/1991 | Muller et al. | | | | |
| 5,030,493 A | 7/1991 | Rich | | FOREIGN PATENT DOCUMENTS | | |
| 5,044,405 A | 9/1991 | Driver et al. | | | | |
| 5,044,824 A | 9/1991 | Long, Jr. et al. | | DE | 36 14963 A1 | 10/1987 |
| 5,049,003 A | 9/1991 | Barton | | DE | 37 16 476 C1 | 12/1987 |
| 5,068,940 A | 12/1991 | Sheppard et al. | | DE | 3627556 A1 | 2/1988 |
| 5,077,107 A | 12/1991 | Kaneda et al. | | DE | 38 19 657 C1 | 7/1989 |
| 5,099,911 A | 3/1992 | Vowles | | DE | 33 05 348 C2 | 1/1990 |
| 5,104,595 A | 4/1992 | Hunter | | DE | 3910607 A1 | 10/1990 |
| 5,106,440 A | 4/1992 | Tangeman | | DE | 3931775 A1 | 4/1991 |
| 5,108,533 A | 4/1992 | Long, Jr. et al. | | DE | 4031741 A1 | 6/1991 |
| 5,122,193 A | 6/1992 | Derlein | | DE | 41 03 980 C1 | 8/1992 |
| 5,143,244 A | 9/1992 | Kauffman | | EP | 0155406 A2 | 4/1986 |
| 5,150,989 A | 9/1992 | Long, Jr. et al. | | EP | 0 256 140 A1 | 2/1988 |
| 5,154,936 A | 10/1992 | Driver et al. | | EP | 0168053 A2 | 7/1988 |
| 5,163,481 A | 11/1992 | Catallo | | EP | 0275060 A1 | 7/1988 |
| 5,172,730 A | 12/1992 | Driver | | EP | 0275924 A2 | 7/1988 |
| 5,186,215 A | 2/1993 | Gilleland | | EP | 0391270 A1 | 10/1990 |
| 5,205,886 A | 4/1993 | White | | EP | 0 403 133 | 12/1990 |
| 5,213,727 A | 5/1993 | Gargiulo | | FR | 1150981 A | 1/1958 |
| 5,225,121 A | 7/1993 | Yokoshima | | FR | 2579294 A1 | 9/1986 |
| 5,230,842 A | 7/1993 | Munde | | GB | 635096 A | 4/1950 |
| 5,241,993 A | 9/1993 | Stephens | | GB | 989870 A | 4/1965 |
| 5,246,641 A | 9/1993 | Perkins et al. | | GB | 1039836 A | 8/1966 |
| 5,265,648 A | 11/1993 | Lyon | | GB | 1340068 A | 12/1973 |
| 5,265,671 A | 11/1993 | Vowles | | GB | 1357355 A | 6/1974 |
| 5,265,981 A | 11/1993 | McNeil | | GB | 1423819 A | 2/1976 |
| 5,271,433 A | 12/1993 | Schwert et al. | | GB | 1449455 A | 9/1976 |
| 5,280,811 A | 1/1994 | Catallo | | GB | 2133497 A | 7/1984 |
| 5,285,741 A | 2/1994 | Askin | | GB | 2218773 A | 11/1989 |
| 5,286,144 A | 2/1994 | Griner | | JP | 58208014 A | 12/1983 |
| 5,307,608 A | 5/1994 | Muir et al. | | JP | HEI63-5921 | 11/1988 |
| 5,309,947 A | 5/1994 | Hinger | | WO | WO 83/03131 | 9/1983 |
| 5,322,653 A | 6/1994 | Muller | | WO | WO 92/15817 | 9/1992 |

INVERSION LINER AND LINER COMPONENTS FOR CONDUITS

RELATED APPLICATION DATA

This application is related to commonly assigned U.S. Pat. Nos. 5,836,357; 5,931,199; 5,911,246; and 5,873,391 which are all hereby incorporated by reference.

FIELD OF THE INVENTION

This invention relates to conduit liners for making repairs in underground piping systems, and more particularly to inversion liners that provide improved strength and greater inversion speed.

BACKGROUND OF THE INVENTION

Underground piping systems are essential in providing the transportation of liquids and gases to homes and businesses. Used mostly by utilities in sewer pipes, water pipes, water mains, gas mains, electrical conduits and other applications, such pipes are often found many feet under ground or in inaccessible areas, such as under buildings or roadways.

Due to cyclical loadings, premature wear, manufacturing defects, corrosion, and other factors, these pipes can often develop cracks or weakened areas requiring repair. Since the replacement of underground pipes is extremely costly, an alternative is to provide a lining repair while leaving the remaining pipe structure in place. Various types of lining products have been commercialized in the past, some flexible, some rigid and some flexible when applied, but rendered rigid by a resin after application. In most cases, it is highly desirable to closely conform the lining to the inner surface of the pipe. This has been generally accomplished by pressure-expandable techniques and inversion techniques.

In a "pressure-expandable" technique (also called the "winch-in-place" technique), a pliable polyester felt sleeve, which has been previously impregnated with a thermosetting resin is inserted into a damaged pipe portion and pressurized so that the resin-impregnated liner presses firmly against the inner wall of the damaged pipe. The expanded liner is then permitted to cure to form a new lining within the original pipe. More recently, pressure-expandable conduit liners have been introduced with glass reinforcement dispersed along the inner and outer surfaces of the liner. See Kittson, et al., U.S. Pat. No. 5,836,357, which is hereby incorporated by reference.

In the "inversion" technique, the pipe liner is first impregnated with a suitable curable synthetic resin. The resin-filled liner is next inserted into a pipe. The leading end of the liner is turned back onto itself and fixed to the lower end of a feed elbow of a manhole. A fluid, such as water or air, is pumped into the feed elbow which causes the liner to invert into and along the interior of the pipe. The liner is maintained in engagement with the pipe until the resin cures. After the resin cure has been completed, the fluid is drained from the inside of the liner, thus leaving a hard, rigid lining applied to the pipe's inner surface.

Most inversion liners are formed of heavily needled felt of polyester or acrylic fibers. Needling causes the fibers to generally extend in right angles to the plane of the material, which results in a less optimized tensile strength than if the fibers were oriented in the plane of the material.

Efforts to improve upon the mechanical properties of felt liners have included flowing chopped glass fibers onto the felt web prior to needling, Wood, U.S. Pat. No. 4,390,574, or needling the felt with reinforcing fibers, such as carbon fibers, Kevlar® fibers or high tenacity polypropylene fibers, such as disclosed in Wood, U.S. Pat. No. 4,836,715. Other techniques include the use of glass fiber cloth, mat or felt, or a non-woven felt of a mixture of synthetic and glass fibers, such as disclosed in Kamiyamma, et al., U.S. Pat. No. 6,018,914.

The introduction of glass or other high strength fibers in needling operations, while increasing the average tensile strength of the fibers themselves, still presents a less than desirable orientation, since the needled reinforcing fibers are also generally disposed at right angles to the plane of the material.

Kittson, et al., U.S. Pat. No. 5,836,357, shown in FIG. 2, teaches the use of glass roving in conjunction with chopped glass fibers for improving the tensile strength in at least the longitudinal direction of the liner. The Kittson et al. liner is "glass-faced", being formed by a pair of glass fiber layers 2 and 3 stitched with a thread to a pair of felt layers 4 and 5, and sewn together in a tubular form. While this dramatically improves the liner's mechanical properties, this liner has not been recommended for inversion techniques, and was designed for winch-in-place applications. The Kittson, et al. liner is also difficult to "build", as in the subsequent building-up of additional liner layers due to the fact that glass layers are not "heat bondable" through conventional means. In addition, a separate impermeable foil or film must be added to contain pressure for expansion of this liner by heated fluids. Moreover, artisans have generally regarded building up layers of liners within an underground pipe to be impractical.

Accordingly, there remains a need for an inversion liner that can optionally be built up, such as by heat bonding or by adhesive bonding, for example, with several liner layers for large diameter pipe and manhole applications. There further remains a need for a reinforced inversion liner material, suitable for small and large conduits alike, which can be made thicker by layering a number of simple building blocks, preferably without significantly affecting the overall modulus of the liner.

SUMMARY OF THE INVENTION

The present invention provides inversion liners which, in a first embodiment, include a first flexible fabric layer fastened to a first glass fiber containing layer, a second flexible fabric layer fastened to a second glass fiber containing layer, and a third flexible fabric layer comprising a substantially fluid impermeable layer. These three flexible fabric layers are joined together such that the first and second glass fiber containing layers are sandwiched between the first and second flexible fabric layers, and the third flexible fabric layer is joined to the second flexible fabric layer so that the substantially fluid impermeable layer becomes the outermost layer, and the first flexible fabric layer becomes the innermost layer of the inversion liner, prior to inversion. Following inversion, the resin saturated first flexible fabric layer conforms to the conduit's inner diameter and cures, preferably forming a mechanical lock therewith, while the substantially fluid impermeable layer becomes the liner's inner diameter surface, protecting the conduit and the liner from the corrosive effects of the conduit's contents.

In a more detailed version of this invention, an inversion liner is provided which includes a first flexible fabric layer containing a polyester felt stitched to a first plurality of glass fibers and a second flexible fabric layer containing a polyester felt stitched to a second plurality of glass fibers. The first and second flexible fabric layers are stitched to the first and second pluralities of glass fibers so that the glass fibers face one another and are sandwiched between the first and second flexible fabric layers. Added to the second flexible fabric layer is a third flexible fabric layer containing a polyester felt and first and second opposing surfaces. The first surface is bonded to the second flexible fabric layer by a heat bond and the second surface of the third flexible fabric layer is coated with a substantially fluid impermeable resinous material.

In still a further embodiment of this invention, a glass-faced liner is provided which includes a first glass fiber containing layer, a first flexible fabric layer fastened to the first glass fiber containing layer, and a second flexible fabric layer disposed over the first flexible fabric layer. A second glass fiber containing layer is disposed over the second flexible fabric layer and fastened thereto, and a third flexible fabric layer is disposed over the second glass fiber containing layer and fastened thereto. This embodiment further includes a fourth flexible fabric layer disposed over the third flexible fabric layer and fastened thereto, and a substantially fluid impermeable layer joined to the fourth flexible fabric layer which becomes the innermost layer of this inversion liner after inversion. This last embodiment is extremely strong, having a flexural modulus of about 700–800 ksi (higher than polyester felt tubes which are about 300 ksi), and can be used for small diameter pipe in layers of less than 15 mm, preferably about 6–12 mm, in thickness, without requiring multiple layers.

Finally, a substantially fluid impermeable liner material, useful as a sub-component for the inversion liners of this invention, is provided, which includes a thin felt having a thickness of about 0.5–3.0 mm. The thin felt includes first and second surfaces thereon, the first surface including a flame-bondable resinous fiber, and the second surface being at least partially penetrated by a resinous material to form a fluid barrier. Alternatively, this impermeable liner material could be adhered or glued to other layers, instead of flame-bonding, and the resinous penetration could be substituted or used in conjunction with a coating or laminated plastic film.

Accordingly, invertible liners made with building blocks of "fabric-glass-glass-fabric" configurations can be provided by this invention. The "fabric-glass-glass-fabric" building blocks can be layered together in 3–9 layers or more, to form tubular products of various diameters and thicknesses, and are especially suited for large diameter pipes in excess of 24 inches, and more preferably, pipes and conduits greater than 48 inches in diameter. This size domain has traditionally been served by felt liners alone, but now can be successfully tackled with glass reinforced liners produced in accordance with the present teachings. While it is expected that the modulus or tensile strength of the composite liners of this invention would increase with the addition of glass fibers, testing liners produced in accordance with these teachings has shown improvements in the flexibility of the liner during the inversion process, a quite unexpected result. Glass fibers have significantly higher stiffness and tensile strength than polyester felt fibers, and would lead one to suspect that the inversion process, being a severe form of flexural force, would tend to be more difficult with the addition of stiffer, higher modulus fibers. However, in inversion testing in pipes up to 500 feet in length, the liners of this invention, incorporating glass fiber-containing layers, had inversion speed increases of about 10–30%.

Because of the higher modulus and strength attributable to the glass and fabric building blocks of this invention, a significant reduction in liner wall thicknesses can be achieved, compared to 100% felt liners, while still satisfying the standard design equations of the pipe rehabilitation industry.

BRIEF DESCRIPTION OF THE DRAWINGS

The accompanying drawings illustrate preferred embodiments of the invention according to the practical application of the principles thereof and in which.

DETAILED DESCRIPTION OF THE PREFERRED EMBODIMENT

Figure 1:
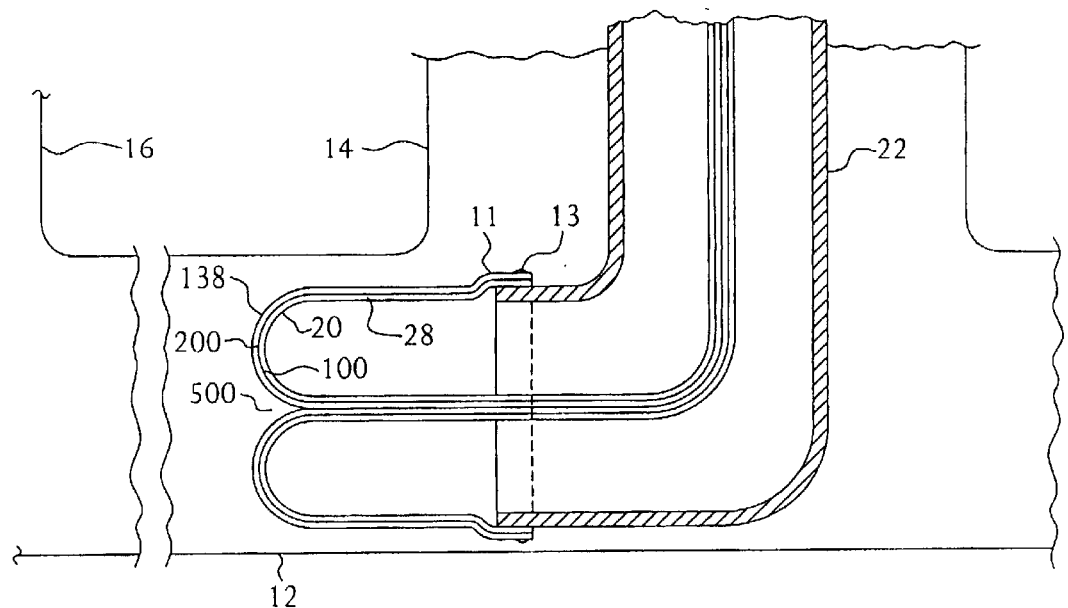
FIG. 1: is a diagrammatic cross-sectional view illustrating a preferred double-block inversion liner of this invention disposed within a pipe.
Figure 2:
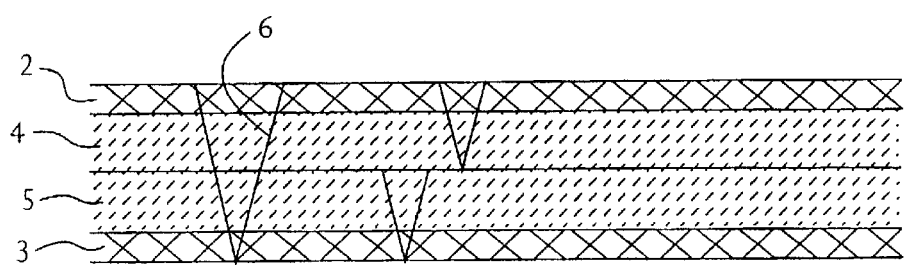
FIG. 2: is an enlarged cross-sectional view of a segment of a typical prior art lining having a glass-faced construction.

The present invention is related to inversion liners of the type that can be inverted with the assistance of fluid pressure, such as compressed air, steam or hot water (hereinafter "fluids") to expand within a defective conduit and generally, mechanically mate or bond within, or come in close proximity to, the inner diameter of the conduit prior to curing to form a substantially corrosion and water resistant sleeve. As such, the liners of this invention are thin, tubular members which can exhibit a tubular, tape-like or ribbon-like cross-section prior to inversion. As used herein, the term "buildable" refers to the ability of the liners of this invention to be adhesively bonded to a second or subsequent liner to build up the thickness of the liner to its final thickness, and the term "glass-faced" means a liner having at least one glass layer located on, or proximate to, its face or faces. Building techniques for liner materials are often useful for large pipes of 36–40 inches or greater in diameter, in which liner building blocks of about 4–14 mm are added together to build up to a thickness of about 25–44 mm in final thickness, for example. This building can be done whenever the tube is assembled, by the manufacturer or installer, for example, preferably before inversion or installation. The liners described herein provide high flexural modulus and strength but are still vibration and corrosion resistant.

With reference to the drawings, and particularly FIGS. 1 through 4 and 6 thereof, there is shown a preferred inversion liner or liner block 100 containing first and second flexible fabric layers 18 and 28 adhesively, mechanically and/or heat bonded to one or more glass fiber containing layers 24 and 34. This is most preferably accomplished, for example, by stitch thread 33 sewn to bond the fabric layer 18 to the glass fiber containing layer 24, and the flexible fabric layer 28 to the glass fiber-containing layer 34, then followed by stitching all of these layers 28, 38, 24 and 18 together. The resulting form, shown in FIG. 3, includes one or more longitudinal seam portions, preferably an outer seam portion and an inner seam portion which are preferably not radially aligned so as to avoid a continuous radial discontinuity through the wall thickness of the conduit liner 100, as described in Kittson et al., U.S. Pat. No. 5,836,357.

Figure 3:
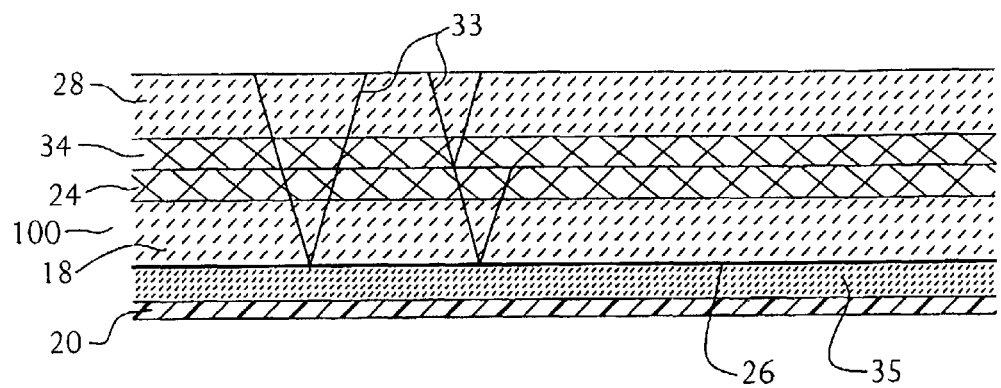
FIG. 3: is an enlarged cross-sectional view of a segment of a preferred liner of this invention.

In the preferred embodiment of FIG. 3, glass-faced needled felt is manufactured in blankets by disposing chopped glass and/or glass roving onto a moving felt. The glass fibers are stitched or sewn onto each of the flexible fabric layers 18 and 28 separately, thus forming, in the preferred embodiment, individual glass containing layers 24 and 34. These "layers" can be continuous or discontinuous, meaning that there may be gaps or undulations in the glass containing layers 24, 34 of liner block 100; layers 124, 134 of liner block 200; layers 234, 224 of liner 300; and layers 324 and 334 of liner block 400. The glass containing layers 24, 34, 124, 134, 234, 224, 324 and 334 may or may not be needled, stitched, flame bonded and/or adhesive bonded to other components of the liner blocks 100, 200 and 400, and liner 300. Glass-faced flexible fabric layers made in accordance with these teachings are cut to size and, preferably, are joined by stitches 33 which assemble them together as shown in FIGS. 3, 4, 5 and 6. Alternatively, glass containing layers 24, 34, 124, 134, 234, 324 and 334 can comprise preformed glass mats stitched or needled into the flexible fabric layer, for example. Additionally, instead of two glass containing layers, such as glass containing layers 24 and 34, a double thickness glass layer can be applied to one of the flexible fabric layers, such as flexible fabric layer 28, without adding glass fibers to the other, such as flexible fabric layer 18.

Liner or liner block 100 is illustrated to be nearly identical to liner block 200, which contains glass containing layers 124 and 134, and flexible fabric layers 148 and 138. However, since liner or liner block 100 is designed to be the innermost layer, following inversion, a substantially fluid resistant layer 20 is applied. With other liner systems, such fluid impermeable layers were provided by a fluid impermeable foil or "calibration hose" which could be removed or left in place. The present invention desirably provides thinner flexible fabric layers 35 or 235, such as needled polyester felt layers having a thickness of about 1–3 mm. These flexible fabric layers 35 and 235 preferably contain a first surface, which contains flame-bondable fibers, for bonding to flexible fabric layer 18 and veil 228, for example. They also include a substantially fluid impermeable layer 20, such as a coating, film or saturant, having a thickness of about 0.1–1 mm, so that the final thickness of the plastic-coated fabric is about 1.1–3 mm, preferably about 1.2–1.8 mm. Preferably, the substantially fluid impermeable layer 20 is partially disposed within the porosity of the flexible fabric layers 35 and 235 to form a mechanical or melt bond.

With respect to liner or liner block 100, the flexible fabric 35, containing the substantially fluid impermeable layer 20, is heat bonded, such as by flame tacking, to the flexible fabric layer 18. In like manner, the flexible fabric layer 28 of liner 100 can be flame tacked to the flexible fabric layer 148 to form a melt bond 126. Melt bonds 26 and 126, as well as melt bonds 226 and 326, while strong, are temporary fastening measures.

In the preferred inversion liner blocks 100, 200 and 400, and liners 300, 500 and 600 of this invention, the glass fiber-containing layers 24, 34, 134, 124, 234, 224, 334 and 324 represent the reinforcement layers and are preferably of a thin cross-sectional thickness, such as less than 5 mm, preferably about 0.1–3 mm, and most preferably, about 0.6 mm, 1 mm and 1.5 mm for standard 4 mm, 6 mm and 9 mm building blocks, respectively. The flexible fabric layers 18, 28, 138, 148, 238, 218, 318, 328, 35 and 235 are preferably about 0.5–14 mm in thickness each, preferably 1–6 mm, and most preferably about 1.33 mm, 2 mm and 3 mm for 4 mm, 6 mm, and 9 mm building blocks, respectively. Glass fiber-containing layers 24 and 34 in liner or liner block 100; layers 24, 34 and 124, 134 in composite liner 500; and layers 24, 34, 124, 134 and 324, 334 in composite liner 600, are desirably located radially outwardly, preferably less than 5 mm, and more preferably, less than 2.5 mm, from the outermost fabric-containing layers, prior to inversion, so as to provide flexural modulus and strength to the cured liner 100. Accordingly, glass fiber-containing layers, such as layers 124 and 134 of composite liner 600 of FIG. 6, can be optionally lightened or eliminated, since they are located along a neutral axis when the laminate if flexed and do not significantly contribute to the flexural performance of the liner 600.

For the glass-faced liner 300, improved flexural modulus and strength is most desirably accomplished by placing the glass containing layer 224 no more than 2.5 mm from the liner's surface, and more preferably, within about 1.2–1.8 mm. Thicknesses for the plastic or resin coated flexible fabric layers 35 and 235 should be about 0.1–3.0 mm, preferably about 0.25–2 mm, and more preferably about 0.75–1.25 mm. The veil 228 should be as thin as possible while still permitting bonding (by heat or other methods) to the next flexible fabric layer. The veil 228 may have a thickness of only about 0.01–1 mm, preferably about 0.1–0.3 mm. The impermeable layer itself 220 should be less than 1 mm thick and, preferably, less than 0.5 mm thick.

The preferred fabric layers 18, 35 and 28 of liner 100, fabric layers 138 and 148 of the second liner 200, fabric layers 238, 218, 228 and 235 of liner block 300, and fabric layers 318 and 328 of liner block 400, can be one or more sewn or bonded fabric layers, comprising a natural or synthetic fibrous material in needled, knit, woven or non-woven mat form. Suitable materials should be water and corrosion-resistant. Examples of fibers for such fabrics include pulp fiber, hemp, cotton, polyethylene, polypropylene, rayon, nylon and/or polyester fibers. In certain instances, woven or non-woven glass material can be used in addition to, or as a substitute for, these other fibers. The most preferred embodiment for the fabric layers is a needle-punched non-woven polyester or acrylic felt employing standard technology for manufacturing needle-punched materials.

The glass fiber-containing layers 24, 34, 124, 134, 234, 324, 224, 324 and 334 of this invention preferably contain chopped glass fibers, glass roving, or both. Glass fiber compositions can include, for example, E, D, R, AR, S and/or C-type glass fibers. Such fibers can be blended with, or replaced by, thermoplastic (such as, polypropylene, polyamide, or polyethylene), or thermosetting, such as polyester, or other materials such as, carbon, graphite or basalt fiber. Alternatively, one hundred percent glass fibers can be distributed over the surface of flexible fabric layers 18, 28, 138, 148, 218, 238, 324 and 334, for example, and mechanically bonded thereto to produce a base layer for the liner blocks 100, 200 and 400, and liner 300. This can be accomplished using a light needling process which keeps the majority of the glass fibers properly oriented, or more preferably, a stitch mat process, in which the preferred needle punched polyester mat is stitched to a plurality (about 200–1000 g/m$^2$) of chopped glass fibers on its top surface. This results in a fiber glass-coated-polyester substrate laminate. Preferably, unidirectional polymer or glass rovings (750–2,200 tex) can also be provided in the machine direction or cross-machine direction, or in both directions, to allow for the handling of the resulting laminate without significant unintended stretching. Although a uniform application of glass fibers is illustrated in the Figures, the glass fibers can be unevenly distributed on each or some of the fabric layers, or disposed in a double thickness on one fabric layer, such as fabric layer 28, while not applying any fibers to the other fabric layer, such as layer 18, prior to final stitching.

Figure 4:
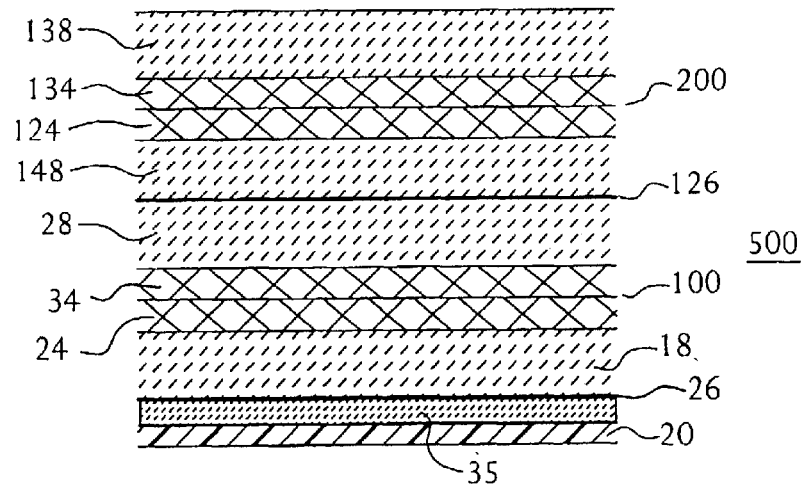
FIG. 4: is an enlarged cross-sectional view of a segment of a composite double-block liner, including the liner of FIG. 3.
Figure 5:
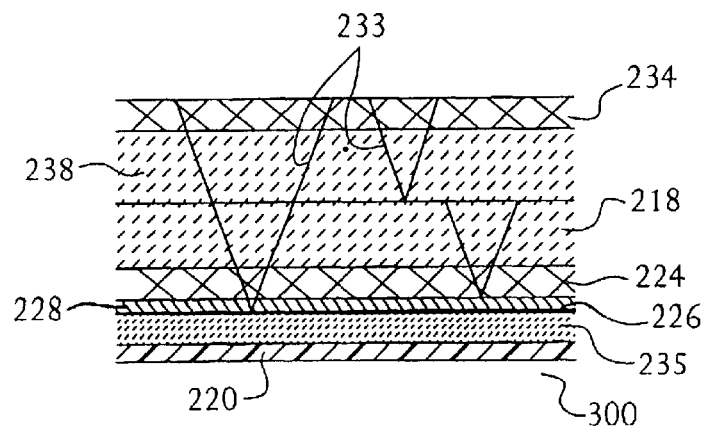
FIG. 5: is an enlarged cross-sectional view of a segment of an improved glass-faced liner of this invention.
Figure 6:
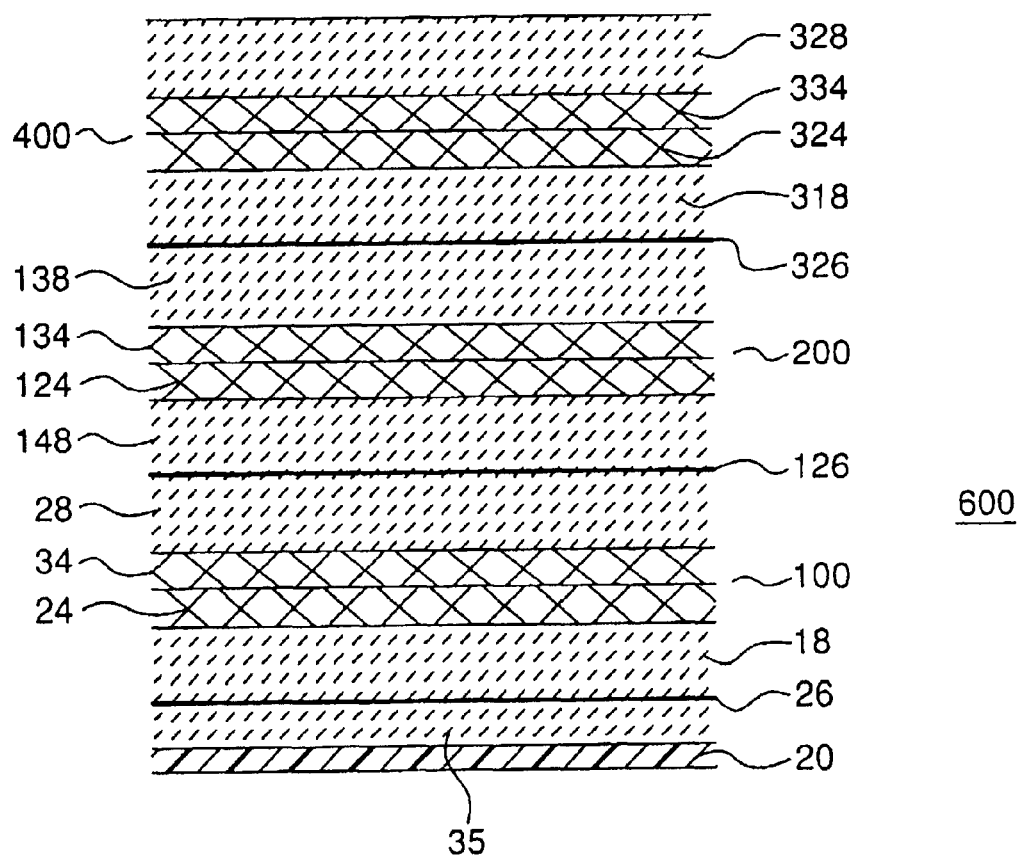
FIG. 6: is an enlarged cross-sectional view of a segment of a composite triple-block liner, including the double-block liner of FIG. 4.

Because of the glass fiber reinforcement, the cured conduit liners of this invention, for example, liners 500 of FIG. 4, 300 of FIG. 5 and 600 of FIG. 6, will have a flexural modulus of at least about 650 ksi and, typically, about 700–800 ksi or more, with a tensile modulus of at least about 5,000–9,000 psi. The glass-faced liner 300 of FIG. 5 will have a modulus of about 700–800 ksi or more, due to the outer glass-containing layers 224 and 234 being located at or near the surface. These properties represent a tremendous improvement over cured 100% polyester felt conduit liners, which are known to have a flexural modulus of less than 500 ksi, and commonly about 300–400 ksi. In these forms, this invention preferably uses a total of no more than about 5 mm, preferably less than 1–3 mm of glass, in each of the liner blocks 100, 200, in composite liners 500 and 300, with the balance being polyester or other fabric material. A full thickness 100% glass liner could be used with some additional cost, such as, for example, by using a pair of needled glass felt layers with chopped glass and/or glass roving sandwiched therebetween. Alternatively, the glass component can be limited to the outermost liner blocks only, such as within liner blocks 100 and 400 in composite liner 600. The same would also apply to composite liners having 5, 7 and 9 liner blocks, for example.

In addition, a substantially fluid-impermeable layer 20 or 220, such as a membrane, coating, saturant, film or resinous latex coating, can be provided on fabric layers 35 and 235, and optionally on the innermost surface (prior to inversion) of the liner, such as fabric layers 28 and 138, or on glass-containing layer 234 of liner 300, to prevent fluid leakage and aid in pressurization. In the preferred embodiment, the fabric layers 35 and 235 are (1) painted or coated with a latex saturants such as polyurethane or acrylic, or (2) melt bonded to a polyethylene film, on one side only. In a preferred embodiment, a thin polyester felt of about 0.8–1.5 mm can be heat bonded to a thermoplastic film of about 0.3–0.5 mm in thickness for a final thickness of about 1.2–1.8 mm.

The membrane, film, coating or layer should be substantially impermeable to fluids, such as air, steam or water, at a pressure of less than 1 atmosphere (15 psi), preferably about 3–5 psi, and temperatures of about 100–260° F. For example, in a hot water cure system the temperature of the water can be cycled up to 180–190° F. More specifically, the heat can be applied from one side, ramped from ambient to 180° F. over 3–4 hours, and held at 140° F. for one-half hour. The exothermic reaction for a thermosetting resin should occur during the 140° F. hold, and peak at 250–260° F. A temperature of 180° F. is maintained for 3 hours, then the liner is cooled at a rate of no higher than about 15° F. per hour down to about 10° F. over ambient.

The liners 300, 500 and 600 of this invention are designed to be impregnated with a curable or settable resin. The resinous impregnation liquid introduced into the fabric layers 18, 28, 35, 138, 148, 218, 238, 228, 235, 318, and/or 328, glass fiber-containing layers 24, 34, 134, 124 and/or 224, or within all or some of these layers, can be any number of thermosetting or thermoplastic compositions which can be introduced by dipping, injecting, extruding or painting, for example. The resinous impregnation liquid becomes set or hardened by light or heat to provide a solid matrix around the fibers. Suitable thermoplastic compositions include thermoplastic polyvinyl chloride, polyolefins, and the like. Suitable thermosetting resins can include those containing a heat-activatable curing agent, a light-activatable agent, a curing agent, or a heat deactivatable curing retarding agent. Such examples include ultraviolet curing unsaturated polyester, such as disclosed in U.S. Pat. No. 6,170,531, incorporated herein by reference, vinyl ester, epoxy and thermosetting polyester.

The liners 300, 500 and 600, and optionally, liner blocks 100, 200 and 400 of this invention further include an adhesive, glue, solvent, flame and/or melt bonds 26, 126, 226 and 326. The bonds 26, 126, 226 and 326 preferably include a flame or melt bond between molten fibers of polyester felt or polyolefin fibers, for example. The bonds 26, 126, 226 and 326 preferably "tack" the adjoining layers together so that they can be resin impregnated, inserted into a pipe and inverted under pressure without breaking apart. Curing of the resinous saturant will provide the final bond between fabric and glass layers to provide the final tensile and hoop strength.

With respect to FIG. 1, one procedure for inserting the preferred inversion liner 500 of this invention will now be described. This improved method is designed to repair a crack in a ruptured underground conduit 12, such as pipes, mains or drains. Man holes, when not already present, can be provided on opposite sides of the ruptured pipe sections after the pipe 12 has been suitably emptied and the particular section is uncoupled from adjacent sections. The unexpanded inversion liner 500, containing the composite liner portions 100 and 200 of FIG. 4, is then inserted into the cleaned pipe 12, the free end 11 is then inverted and clamped by fasteners 13 to the feed elbow 22. Hot pressured fluids, such as steam, air or water can be pumped into the liner 500 until it completely inverts and expands. This pressure can remain within the liner 500 until the thermosetting or thermoplastic resin impregnated therein sets or cures. The free end of the liner 500 can then be removed from the elbow 22 and the repaired section of the pipe 12 re-coupled to the adjacent pipe sections. The liners 100, 200, 300 and 500 of this invention may also be used with new or undamaged conduit before installation, or can be used to manufacture original equipment piping and conduit, as a liner, or as a stand alone product.

From the foregoing, it can be realized that this invention provides improved inversion liners having reinforced glass fiber-containing layers for improving the hoop and longitudinal strength of the liner material, while providing a heat or light-activatable saturant for curing. Although various embodiments have been illustrated, this is for the purpose of describing, but not limiting the invention. Various modifications, which will become apparent to one skilled in the art, are within the scope of this invention described in the attached claims.

What is claimed:

1. A tubular inversion liner for conduits, including at least one liner block, comprising:
   (a) first flexible fabric layer fastened to a first glass fiber containing layer;
   (b) a second flexible fabric layer fastened to a second glass fiber containing layer;
   (c) said first and second flexible fabric layers and said first and second glass fiber containing layers fastened together whereby said first and second glass fiber containing layers face one another and are sandwiched between said first and second flexible fabric layers;

(d) a third flexible fabric layer comprising a substantially fluid impermeable layer joined thereto, said third flexible fabric layer joined to said second flexible fabric layer by melt boding or adhesion without stitching or needling, so that the first flexible fabric layer becomes the innermost layer of said inversion liner prior to inversion.

2. The tubular inversion liner of claim 1 wherein said first, second or third flexible fabric layers comprise a felt, and said first and second glass fiber layers comprise chopped glass fibers and glass roving.

3. The tubular inversion liner of claim 1 wherein said substantially fluid impermeable layer comprises a resinous membrane or coating.

4. The tubular inversion liner of claim 3 wherein said resinous coating comprises a polyurethane coating which is adhered to a first surface portion of said third flexible fabric layer.

5. The tubular inversion liner of claim 1 wherein said first and second flexible fabric layers comprise a polyester needled felt, and said first and second glass fiber containing layers are sewn or stitched thereto.

6. The tubular inversion liner of claim 1 wherein said liner is impregnated with a heat-curable resin, and cured to produce a flexural modulus of at least about 500 ksi.

7. The tubular inversion liner of claim 6 including a second liner block bonded to said first flexible fabric layer, said second liner block comprising a third and a fourth glass fiber containing layer sandwiched between a second and a third flexible fabric layer, said at least one liner block sewn, heat, flame or adhesive bonded to said second liner block prior to inversion.

8. The tubular inversion liner of claim 1 having an inversion rate which is at least 10% faster than the inversion rate for a 100% polyester felt liner of like dimensions.

9. The tubular inversion liner of claim 1, wherein the first and second glass fiber containing layers include glass rovings provided in a machine direction, a cross-maching direction, or both.

10. The tubular inversion liner of claim 1, wherein the first and second glass fiber containing layers include glass rovings provided in a machine direction.

11. A method of lining a conduit, comprising:

(a) providing a tubular inversion liner comprising a first flexible fabric layer fastened to a first glass fiber containing layer; a second flexibl fabric layer fastened to a second glass fiber containing layer; said first and second flexible fabric layers and said first and second glass fiber containing layers fastened together whereby said first and second glass fiber containing layers face one another and are sandwiched between said first and second flexible fabric layers; a third flexible fabric layer comprising a substantially fluid impermeable layer joined thereo, said third flexible fabric layer joined to said second flexible fabric layer by melt bonding or adhesion without stitching or needling, so that said first flexible fabric layer becomes the innermost layer of said tubular inversion line prior to inversion; and a heat-activatable or light-activatable resinous saturant disposed within one or more of the first, second and third flexible fabric layers;

(b) inserting said inversion liner into a conduit by an inversion process wherein said fluid impermeable layer becomes the innermost layer after the inversion process;

(c) heat-activating or light-activating said heat-activatable or light-activatable resinous saturant to cure same.

12. The method of claim 11 wherein said insertion step (b) comprises employing a pressurized fluid to invert the inversion liner and expand it into close proximity with an inner wall of said conduit.

13. The method of claim 12, wherein said pressurized fluid is left in contact with said inversion liner until said resinous saturant is cured.

14. The method of claim 11 wherein said heat-activatable or light-activatable resinous saturant comprises a polyurethane, polyester, vinyl ester, or epoxy.

15. The method of claim 11, wherein step (b) is performed using an inversion rate which is at least 10 % faster than inverting 100 % polyester felt liner of like dimensions. said first and second glass fiber layers comprise chopped glass fibers and glass roving.

16. A tubular inversion liner for conduits, comprising:

a first flexible layer containing a polyester felt stitched to a first plurality of glass fibers; a second flexible layer containing a polyester felt stitched to a second plurality of glass fibers;

said first and second flexible fabric layers and said first and second plurality of glass fibers stitched together whereby said first and second plurality of glass fibers face one another and are sandwiched between first and second flexible fabric layers; and a third flexible fabric layer containing a polyester felt and first and second opposing surfaces thereon, said first of said surfaces bonded to said second flexible fabric layers by melt bonding or adhesion without stitching or needling, and said second surface provided with a substantially fluid impermeable resinous material.

17. The inversion liner of claim 16 wherein said plurality of glass fibers comprises chopped glass fibers and glass roving.

18. The inversion liner of claim 16 wherein sai first and second pluralities of glass fibers comprise a thickness of less than about 5 mm.

19. An invertible glass-faced liner, comprising:

a first glass fiber containing layer; a first flexible fabric layer fastened to said first glass fiber containing layer; a second flexible fabric layer disposed over said first flexible fabric layer;

a second glass fiber containing layer disposed over said second flexible layer and fastened thereto; a third fabric layer disposed over said second glass fiber containing layer and fastened thereto, said third flexible fabric layer being thinner than said first or second flexible fabric layers while still permittingmelt bonding thereto;

a fourth flexible fabric layer disposed over said third flexible fabric layer and bonded thereto my melt bonding or adhesion without stitching or needling; and a substantially fluid impermeable layer joined to said fourth flexible fabric layer, said substantially fluid impermeable layer becoming the innermost layer of said inversion liner after inversion.

20. The glass-faced inversion liner of claim 19 wherein said liner is at least partially impregnated with a heat curable or light curable resin and cured to form a composite having a flexural modulus of at least about 700-800 ksi.

21. The glass-faced inversion liner of claim 19 wherein said third flexible fabric layer comprises a first veil or first thin felt having a thickness of less than 1 mm.

22. The glass-faced inversion liner of claim 21 wherein said third and fourth flexible fabric layers and said substan tially fluid impermeable layer have a total thickness of less than 2.0 mm.

23. The glass-faced inversion liner of claim 21, further comprising a second veil or second thin felt having a thickness of less than 1 mm bonded to said first glass fiber containing layer.

24. A tubular inversion liner for conduits comprising:
   (a) a pair of liner blocks, each block having first and second flexible fabric layers and a glass-containing layer sandwiched therebetween, said flexible fabric layers containing flame bondable fibers;
   (b) further flexible fabri disposed between said pair of liner blocks and melt or adhesive bonded thereto without stitching or needling;
   (c) a thin veil or felt having an impermeable layer heat or adhesively bonded to a first surface of a first one of said pair of liner blocks without stitching or needling;
   (d) wherein said glass-containing layers are disposed within about 2.5 mm from an exterior surface portion of said liner.

25. The tubular inversion liner of claim 24, wherein the pair of liner blocks and the further flexible fabric build up to a thickness of about 25 mm to 44 mm.

26. The tubular inversiion liner of claim 24, wherein at least one of the group consisting of the pair of liner blocks and the further flexible fabric has a thickness of about 14 mm.

27. A method for fabricating a tubular inversion liner for conduits, comprising the steps of:
   (a) providing a pair of liner blocks, each block having first and second flexible fabric layers and a glass-containing layer sandwiched therebetween, said flexible fabric layers conataining fame bondable fibers;
   (b) bonding a thin veil or felt having an impermeable layer at least to a first surface of a first one of said pair of liner blocks using heat or adhesion, without needling or stitching;
   (c) tacking further flexible fabric or at least one further liner block between said pair of liner blocks using heat or adhesion, without needling or stitching either of the pair of liner blocks to the further fabric or further liner block or to each other.

28. The method of claim 27, wherein the pair of liner blocks and the further liner block or flexible build up to a thickness of about 25 mm to 44 mm.

* * * * *